United States Patent [19]
Erben

[11] Patent Number: 6,116,542
[45] Date of Patent: Sep. 12, 2000

[54] DOOR SYSTEM FOR A PASSENGER AIRCRAFT

[75] Inventor: Hannes Erben, Donauwoerth, Germany

[73] Assignee: Eurocopter Deutschland GmbH, Munich, Germany

[21] Appl. No.: 09/148,150

[22] Filed: Sep. 3, 1998

[30]     Foreign Application Priority Data

Sep. 3, 1997 [DE] Germany .......................... 197 38 404

[51] Int. Cl.$^7$ ...................................................... B64C 1/14
[52] U.S. Cl. ...................................................... 244/129.5
[58] Field of Search ........................... 244/129.5, 129.4

[56]          References Cited

U.S. PATENT DOCUMENTS

| | | | |
|---|---|---|---|
| 4,720,065 | 1/1988 | Hamatani | 244/129.5 |
| 5,289,615 | 3/1994 | Banks et al. | 16/366 |
| 5,316,241 | 5/1994 | Kallies et al. | 244/129.5 |

*Primary Examiner*—Robert P. Swiatek
*Attorney, Agent, or Firm*—Evenson, McKeown, Edwards & Lenahan, P.L.L.C.

[57]            ABSTRACT

In a door system for a passenger aircraft, a door panel is mounted on an aircraft structure so that it can pivot around at least one pivot axis and the door panel is movably guided at the end of the inward pivoting movement on a lifting movement path that runs essentially in conformance with the aircraft outside contour and runs transversely to the pivoting direction. Interengaging elements on the door frame and door panel are engaged in the completely closed position, moved out of shapewise engagement in an opposite lifting direction at the beginning of the opening process. The lifting movement takes place in a manner which is favorable for installation and is not prone to problems, while retaining an essentially horizontal pivoting movement path relative to the aircraft structure in such fashion that the pivot axis of the door panel is supported on the door frame with tilting position control and at the end of opening lifting movement, moves into essentially vertical alignment relative to the door frame. A door panel locking system is provided which is operated in the closed position of the door panel and, in a non-liftable manner, locks the door panel to the door frame independently of the swivelling and carrying device and of the tilting position control.

12 Claims, 4 Drawing Sheets

DOOR SYSTEM FOR A PASSENGER AIRCRAFT

BACKGROUND AND SUMMARY OF THE INVENTION

This application relates to German application 197 38 404.8, filed Sep. 3, 1997 in Germany (the priority of which is being claimed), and German application 197 02 084, filed Jan. 22, 1997 in Germany, the disclosures of which are expressly incorporated by reference herein.

The present invention relates to a so-called "plug" type door system with a door panel supported for sequential movement between a door closed position with shapewise interengagement of door frame and door panel structure holding the door panel against lateral opening movements, a door intermediate position with release of the shapewise interengagement, and a door open position with the door panel pivoted and moved to a position conforming to an outside contour of the aircraft body adjacent the door frame.

Known door systems of this type that pivot open (German Patent Document DE 44 13 307 A1), as used in modern passenger aircraft, are of the so-called "plug" type, in other words the door panel, in the completely closed position, is lowered on a curved lifting movement path that matches the external contour of the aircraft with edgewise system hardware integral with the door panel into a shapewise engagement with matching receiving elements fastened to the aircraft structure in the vicinity of the door opening in order to transmit in this fashion the high compressive forces that act on the door panel as a result of the difference in pressure between the cabin interior and exterior pressures during flight, directly and without the interposition of mechanically moved locking elements, from the door panel to the aircraft structure. For opening, the door panel must first be lifted out of shapewise engagement with the receiving elements before it is then pivoted horizontally outward out of the door opening under the control of a supporting and pivoting device that acts between the door panel and the fuselage structure essentially perpendicularly to the lifting movement path, and is then moved in the lateral direction parallel to the outside contour of the aircraft into the completely open position.

In such door systems, the lifting device that consists of the lifting kinematics and the lifting drive is located between the door panel and the supporting and pivoting device, thus ensuring that the pivoting axis of the door panel remains aligned vertical relative to the door frame regardless of the lifting position and thus allows the door panel to move with limited force being applied in the pivoting phase. However, it is difficult to accommodate the lifting device in the narrow installation space between the door panel and the supporting and pivoting device and, since it participates in the pivoting movement of the door panel, the device increases the weight of the door system to be pivoted. In addition, the lifting drive is operated at least by outside energy, namely it is electrically powered, and therefore flexible power supply lines are required between the lifting drive and the door frame, said lines, by comparison to the lifting travel, having to withstand without problems, the pivoting movements that are very large by comparison with the lifting travel, over a plurality of opening and closing cycles.

An improved door system contemplated by the invention provides for problem free lifting movement of the door from the closed position to the intermediate position, followed by an essentially horizontal door panel movement to the open position in a pivoting phase.

According to preferred embodiments of the invention, the lifting movement of the door panel along the curved lifting movement path is effected by a tilting position control on the door frame of the pivoting axis in such fashion that the pivoting axis is aligned vertically relative to the aircraft structure at the end of the opening travel and thus the door panel can be pivoted open and closed essentially in a horizontal direction. On the door frame side, a sufficiently large installation space is normally available for accommodating the tilting position control, and the weight of the door system to be pivoted is significantly reduced by eliminating the lifting device between the door panel and the pivoting device. At the same time, the supply lines for the tilting position control are no longer subjected to the significant pivoting movements of the door panel, thus effectively combating the risk of a functional problem.

As far as a simple design of the pivoting device that contains the pivot axis or axes is concerned, preferred embodiments provide for a supporting arm that is connected rotationally movable with the door panel and with the tilting position control.

In preferred embodiments, the tilting position control of the pivot axis advantageously consists of a mechanical guide that acts between the pivot axis and the door frame, including a motorized tilting position drive, so that additional design simplification and reliable operation of the tilting position control are achieved. In this connection, a spindle drive is advantageously used as the drive, said spindle drive being incorporated into the tilting position kinematics as a linear guiding member and consequently simplifying the latter further. An alternative embodiment of the tilting position control that is especially sturdy in terms of construction, in which nonlinear largely arbitrarily curved guide members approximately in the shape of bent guide rails can also be provided for the tilting position kinematics, provides that the tilting position control contains as a drive, a combined rack and pinion drive curved to match the shape of the guide members. The drive is pneumatically or hydraulically driven but most simply, preferred is electrically driven in especially preferred embodiments.

In order to secure the door panel when it pivots open in the raised lifting position against improper activation of the tilting position drive, the drive is preferably automatically locked when the door panel is pivoted open. In order for the door panel to be lifted at least once out of the "plug" position by the tilting position control if the tilting position drive fails, in certain preferred embodiments of the invention an emergency drive for the tilting position kinematics is provided in addition to the tilting position drive.

In the case of the door systems according to the invention as generally described above, the motor drive of the tilting position control is constructed as a self-locking worm gear in order to prevent that, as the result of vibration or thrust influences, the door panel or door leaf can move by itself out of the fully lowered lifting position and therefore be released from the form-locking engagement with the door-frame-fixed receiving element. Such a lift securing requires a relatively high-expenditure, largely play-free and elasticity-free mechanical coupling of the door panel with the tilting position drive by means of the carrying device and the tilting position control.

In contrast, according to especially preferred embodiments of the invention, the door panel of the door system is secured with respect to the lift by means of a door locking system which is operated in the completely closed position of the door panel and locks this door panel on the door frame independently of the carrying device and the tilting position control.

By means of the direct non-liftable locking of the door panel on the door frame, moving-play-caused or elasticity-caused instabilities of the carrying device and of the tilting position control, including the assigned drive, have no influence on the operational reliability of the door locking system.

In a particularly preferred further development of the invention, the door locking system consists of a locking shaft which is rotatably arranged on the door panel and extends transversely at the level of the locking system operating device essentially along the whole width of the door panel and has locking elements which are fastened on both sides at the respective shaft end and, in the operating position of the door locking system, are rotated in an engagement with corresponding counterelements fixed to the door frame, whereby a constructionally very simple weight-saving further development of the locking system is achieved with a minimal number of component parts.

The operating device of the door locking system according to certain preferred embodiments expediently contains at least one manual lever which is accessible from the interior side of the door panel. Preferably, the door locking system can be manually operated from both door panel sides independently of one another, and, for this purpose, the door panel is provided with a manual lever on the interior side of the door panel and on the exterior side of the door panel, and both manual levers are mutually mechanically uncoupled and are jointly connected to the locking shaft.

Other objects, advantages and novel features of the present invention will become apparent from the following detailed description of the invention when considered in conjunction with the accompanying drawings.

DETAILED DESCRIPTION OF THE DRAWINGS

Figure 1A:
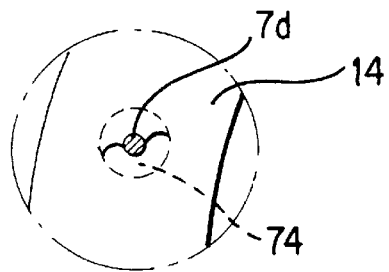
FIG. 1A is a partial view showing the door locking system in a door locking position.

The door system for a passenger aircraft which is illustrated in FIGS. 1–4 contains as the main components a carrying and swivelling device, with a supporting arm 10 and a supporting element 12, which supports the door panel 2, swivellably about the axes of rotation S1, S2, as well as a tilting position control 18 which acts between this carrying and swivelling device 10, 12 and the aircraft door frame 14 and by means of which the door panel 2 is guided out of the completely closed position on a curved lifting movement path upwards and, as a result, is moved out of the form-locking engagement of the door-panel-fixed abutments 6 with the receiving elements 4 fastened to the door frame 14, so that, at the end of the opening lift, it can first be moved out of the door opening 8 toward the outside and subsequently essentially in parallel to the outer contour of the fuselage into the complete opening position, the tilting position control 18 containing a tilting position drive 26 in the form of a worm gear driven by an electric motor for the lifting function.

The supporting and pivoting device required for this purpose comprises a multipartite supporting arm 10, which is rotatably fastened by a pivot axis S1 on door panel 2 and is provided with a supporting element 12 connected to rotate with supporting arm 10 around a pivot axis S2 that is parallel to pivot axis S1, as well as with control links 16 (FIG. 2) operable between door panel 2 and door frame 14 by which door panel 2 is guided in the movement phase in parallel to the outer contour of the fuselage.

The lifting movement of door panel 2 along a curved lifting movement path that is curved to match the outside contour of the aircraft is accomplished by a tilting position control located between supporting element 12 and door frame 14 and designated as 18 as a whole, for pivot axes S1 and S2 of supporting arm 10, which consists of a control lever 24 articulated by a pivot 20 on supporting element 12 and by a pivot 22 on door frame 14 and an electric motor coupling actuator 26 in the form of a spindle drive mounted in a fixed position on door frame 14, whose spindle lock 28 is connected by an additional pivot 30 to supporting element 12.

Figure 2:
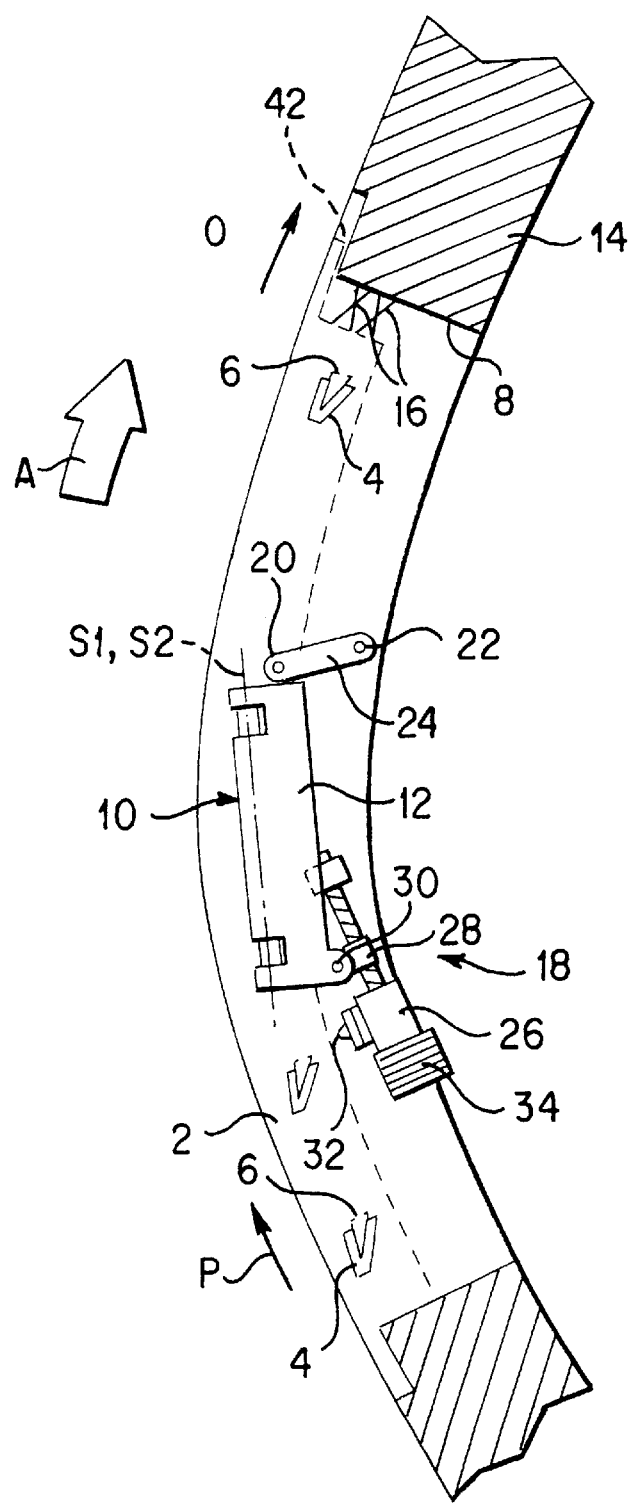
FIG. 2 schematically shows the door system of FIG. 1 in the door closed position.

With the door in the fully closed position (FIG. 2), pivot axes S1, S2 are inclined at an angle relative to the vertical, in other words the yaw axis of the aircraft. However, when drive 26 is actuated, pivot 30 migrates diagonally upward parallel to the spindle axis as shown in FIG. 2 and at the same time control lever 24 pivots around pivot 22, so that pivot axes S1 and S2 are raised and tilted and as a result door panel 2 is moved outward by pivoting and supporting device 10, 12 out of shapewise engagement with receiving elements 4.

Figure 1:
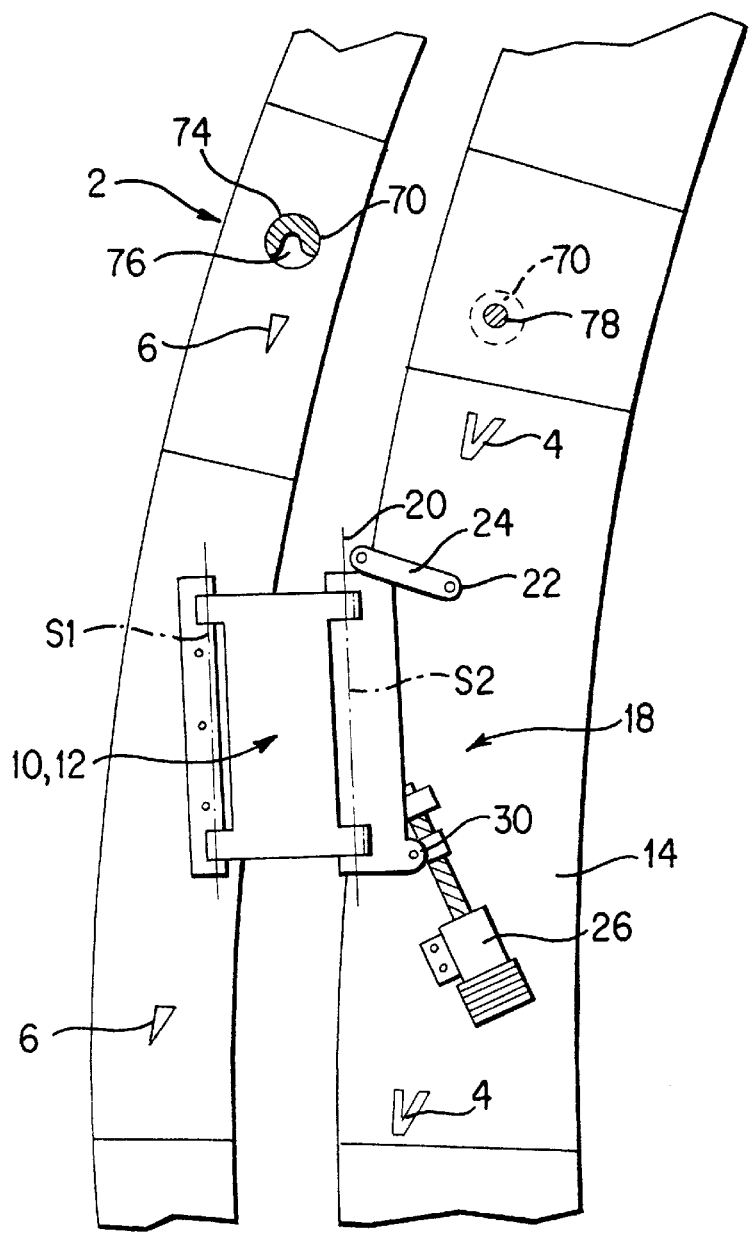
FIG. 1 is a very schematic enlarged partial view of a door system which can be swivelled open and has a door locking system which is independent of the carrying device and of the tilting position control.

The kinematics of tilting position control 18 are chosen so that door panel 2 moves along the desired curved lifting travel path, in other words upper door edge 42 (FIG. 2) is lifted along path curve O and lower door edge 44 is lifted along path curve P, and the pivot axes S1, S2 at the end of the opening lift are aligned vertically relative to the aircraft structure, whereupon door panel 2 can be pivoted outward around pivot axes S1, S2 parallel to the outside contour of the aircraft out of door opening 8 and then can travel in the lateral direction into the fully open position (FIG. 1).

The tilting position end positions of drive 26 are established for example by limit switches (not shown). In order to prevent door panel 2 from being lowered while the door is being pivoted open, drive 26 is provided with a mechanical or electrical latch (contact switch 32). As long as door panel 2 is in door opening 8, the latch releases drive 26. When door panel 2 pivots outward out of door opening 8, drive 26 is blocked by latch (contact switch 32) and lowering of door panel 2 in the raised state is prevented as a result.

In order for the door to be opened at least once without applying force in the event of a total failure or a problem with tilting position drive 26, an emergency drive 34 is provided in tandem with drive 26, said drive 34 normally operating in "idle" and replacing or supporting drive 26 in the event of a malfunction. Emergency drive 34 is activated by an emergency lifting lever (not shown).

In addition, the door system described here contains a separate door locking system 70 (schematically depicted in FIGS. 1, 1A, 3 and 4) which is independent of the carrying and swivelling device 10, 12 as well as of the tilting position control 18 and by means of which the door panel 2 is in a non-liftable manner locked in the completely closed position directly to the door frame 14. In the manner explained below, the door locking system 70 is manual-lever-operated and contains a locking shaft 72 which is rotatably disposed on the door panel 2, extends transversely at the level of the lever operating device along the whole door panel width and has locking elements 74 which are fastened on both sides in each case on the shaft end in the area of the lateral edge of the door panel and are provided with a recess 76 for receiving a corresponding door-frame-fixed locking pin 78 (FIGS. 1, 1A).

In the completely closed position of the door, the locking pins 78 are pushed into the recess 76 and the locking elements 74 are rotated by means of the locking shaft 72 into the locking position—illustrated by a broken line in FIG. 1A—, in which they reach under the locking pins 78 and, as a result, lock the door panel 2 in a non-liftable manner to the door frame 14.

In contrast, when the locking shaft 72 is rotated out of the locking position, the locking elements 74 will arrive in the release position—illustrated by continuous lines in FIG. 1—in which they are freely movable upward unhindered by the locking pins 78 so that the door panel 2 can be lifted by the tilting position drive 26 out of the completely closed position and can then be swivelled open.

Figure 3:
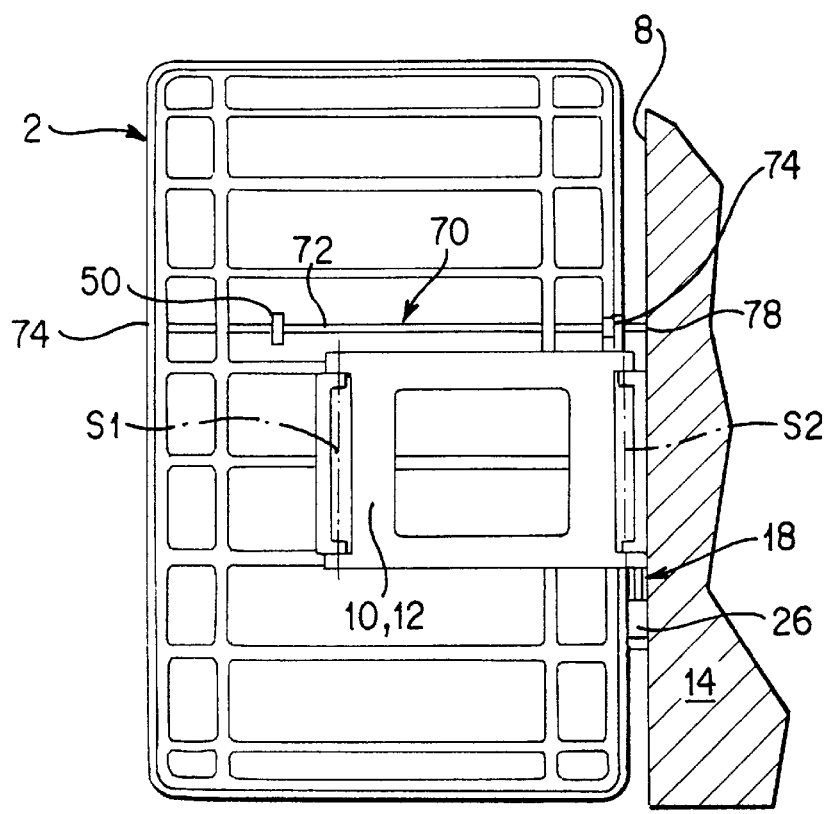
FIG. 3 is a very schematic rear view of the door system according to FIG. 1.

The operating device of the door panel locking system 70 consists of a manual lever 80 on the inside of the door panel and a manual lever 82 on the outside of the door panel (FIG. 3). The manual levers 80, 82 are each connected by way of a lost-motion connection (oblong hole 84) to a two-armed rocker lever 86 which is fastened to the locking shaft 72. When one of the manual levers 80 or 82 is pulled, the locking shaft 72 will swivel into the release position. Because of the mechanical uncoupling of the two manual levers 80 and 82, when one manual lever is pulled, the respective other, not operated manual lever remains in the inoperative position.

Figure 5:
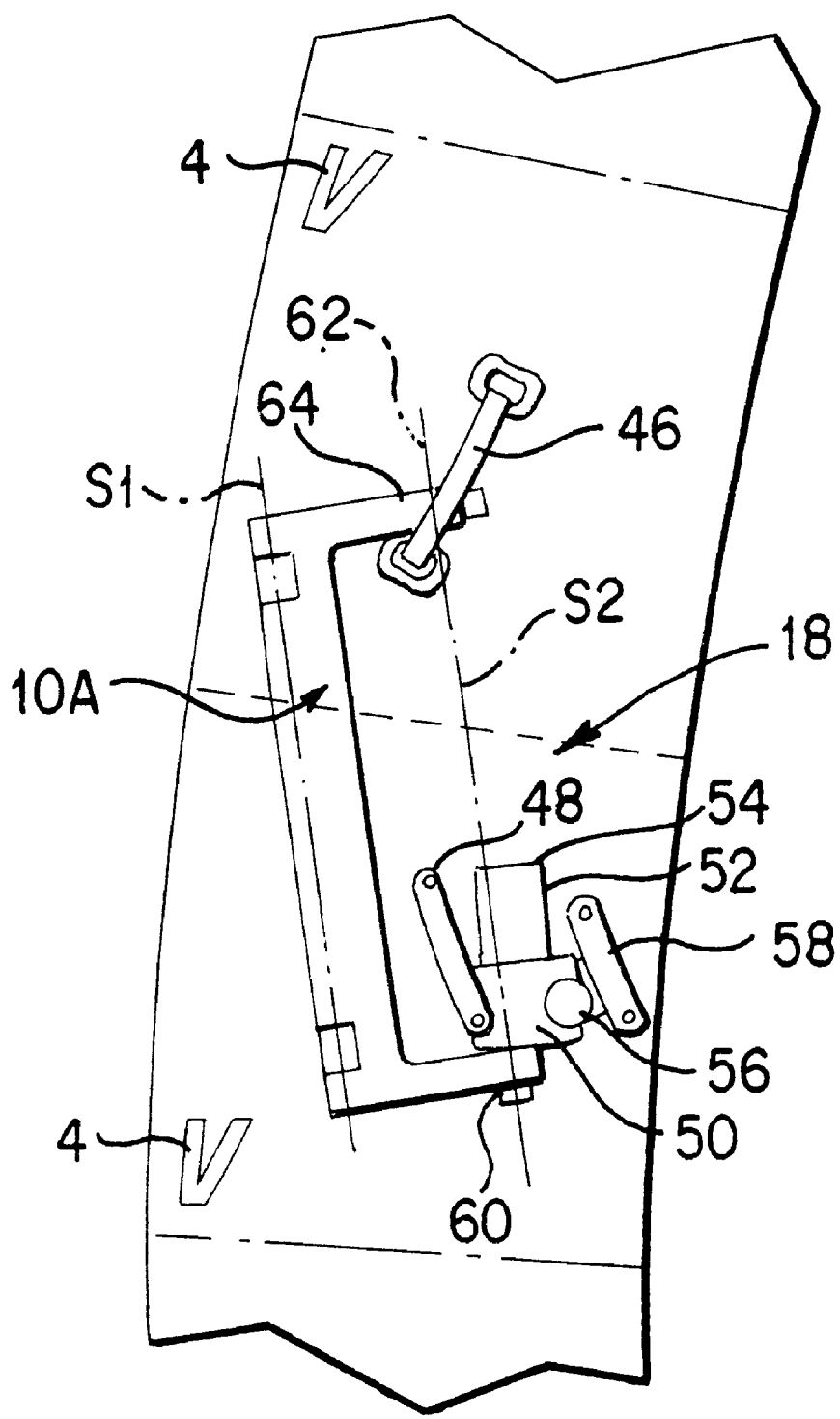
FIG. 5 is a view similar to FIG. 1, showing another embodiment of the invention.

According to FIG. 5, an upper and a lower guide rail 46 and 48 integral with the door frame are provided for controlling the tilting position of supporting arm 10A, instead of the control lever and the spindle guide as in the embodiments of FIGS. 1 and 2. A drive carriage 50 is displaceably guided in lower guide rail 48, said carriage meshing with a rack 58 integral with the door frame by means of a gear 56 driven by electric motor 52 or emergency drive 54. In this case, supporting arm 10A is designed to be integral with the supporting element (corresponding to 12 in FIG. 1) and pivot axis S2 is located directly on drive carriage 50 (rotary bearing 60) or on a slider 62 that is displaceable in upper guide rail 46 (rotary bearing 64).

If drive 52 is activated in the lowered position of tilting position control 18 that is shown, in which the door is in the fully closed position, drive carriage 50 travels upward in guide rail 48, so that support arm 10 is raised and simultaneously tilted under the control of guide rails 46 and 48, so that the door panel (not shown in FIG. 5) is moved out of shapewise engagement with the receiving elements 4 that are integral with the door frame. Guide rails 46 and 48 in turn are so designed that the door panel travels on the required curved lifting movement path and pivot axes S1, S2 at the end of the opening lift are aligned vertically relative to the aircraft structure, whereupon the door panel can pivot freely outward and move into the fully open position. Moreover, the design and function of the tilting position control 18 shown in FIG. 3 is the same as in the first embodiment of FIGS. 1 and 2.

Figure 4:
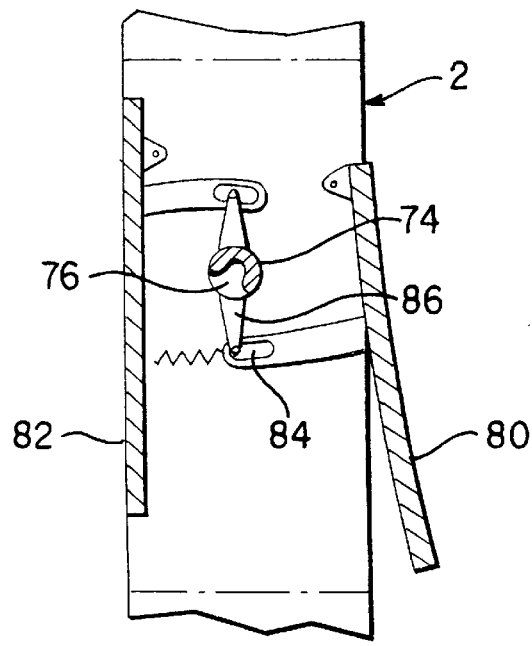
FIG. 4 is a very schematic view of the manual lever operating device of the door locking system.

A separate door locking system 70 as described with respect to FIGS. 3 and 4 is also included in the FIG. 5 system. This locking system is not further illustrated in FIG. 5 since the cooperating features of the door locking system for the FIG. 5 embodiment are the same as for the above described embodiment of FIGS. 1 and 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Door system for a passenger aircraft, having a door panel which is swivelable about at least one axis of rotation hung to the aircraft structure by way of a carrying and swivelling device and which, at the end of a swivelling-in movement, is guided on a lifting movement path which is curved essentially conformally with the outer contour of the aircraft and extends transversely to the swivelling direction in a form-locking engagement with door-frame-fixed receiving elements into the completely closed position and, at the start of the opening operation, can be moved with the opposite lifting direction out of the form-locking engagement, for generating the lifting movement, a tilting position control being provided which supports the swivel axis of the door panel in a tiltable manner on the door frame and, at the end of the opening lift, aligns it essentially vertically with respect to the aircraft structure, wherein a door locking system is provided which is separate from the carrying and swivelling device and is activated in the closed position of the panel and locks this door panel in a non-liftable manner to the door frame independently of the carrying and swivelling device and independently of the tilting position control.

2. Door system according to claim 1, wherein the door locking system comprises a locking shaft which is rotatably arranged on the door panel and extends in a transverse manner at the level of the lock operating device essentially along the whole door panel width and has locking elements which are in each case fastened on both sides on the shaft end and, in the operating position of the door locking system, are rotated in the non-lifting engagement with corresponding door-frame fixed counterelements.

3. Door system according to claim 2, wherein at least one manual lever is provided for operating the locking system, which manual lever is accessible from the interior side of the door.

4. Door system according to claim 3, wherein a manual lever system is provided for operating the locking system, which manual lever system includes an inside lever which is accessible from the interior side of the door panel and an outside lever which is accessible from the exterior side of the door panel, which inside and outside levers, in a mutually mechanically un coupled manner, are connected to the locking shaft.

5. Door system according to claim 2, wherein a manual lever system is provided for operating the locking system, which manual lever system includes an inside lever which is accessible from the interior side of the door panel and an outside lever which is accessible from the exterior side of the door panel, which manual levers, in a mutually mechanically uncoupled manner, are connected to the locking shaft.

6. Door system according to claim 1, wherein at least one manual lever is provided for operating the locking system, which manual lever is accessible from the interior side of the door.

7. A door locking assembly for a plug type door system of an aircraft which has a lifting and tilting assembly operable to support and sequentially move a door panel with respect to aircraft door frame structure between a door closed position, with shapewise interengagement of the door frame and door panel structure holding the door panel against lateral opening movements, a door intermediate position with release of the shapewise interengagement, and a door open position with the door panel pivoted and moved to a position conforming to an outside contour of the aircraft body adjacent the door frame, said door locking assembly being separate from the lifting and tilting assembly and being activatable in the closed position of the door panel to lock the door panel in a nonliftable manner to the door frame structure independently of the lifting and tilting assembly.

8. A door locking assembly according to claim 7, wherein the door locking assembly comprises a locking shaft which is rotatably arranged on the door panel and extends in a transverse manner at the level of the lock operating device essentially along the whole door panel width and has locking elements which are in each case fastened on both sides on the shaft end and, in the operating position of the door locking assembly, are rotated in the non-lifting engagement with corresponding door-frame fixed counterelements.

9. A door locking assembly according to claim 8, wherein at least one manual lever is provided for operating the locking assembly, which manual lever is accessible from the interior side of the door.

10. A door locking assembly according to claim 9, comprising a manual lever system for operating the locking assembly, which manual lever system includes an inside lever which is accessible from the interior side of the door panel and an outside lever which is accessible from the exterior side of the door panel, which inside and outside levers, in a mutually mechanically uncoupled manner, are connected to the locking shaft.

11. A door locking assembly according to claim 8, comprising a manual lever system for operating the locking assembly, which manual lever system includes an inside lever which is accessible from the interior side of the door panel and an outside lever which is accessible from the exterior side of the door panel, which inside and outside levers, in a mutually mechanically uncoupled manner, are connected to the locking shaft.

12. A door locking assembly according to claim 7, wherein at least one manual lever is provided for operating the locking assembly, which manual lever is accessible from the interior side of the door.

* * * * *